May 20, 1952   J. S. STOKES   2,597,041
APPARATUS FOR WRAPPING ARTICLES
Filed March 27, 1947   3 Sheets-Sheet 1
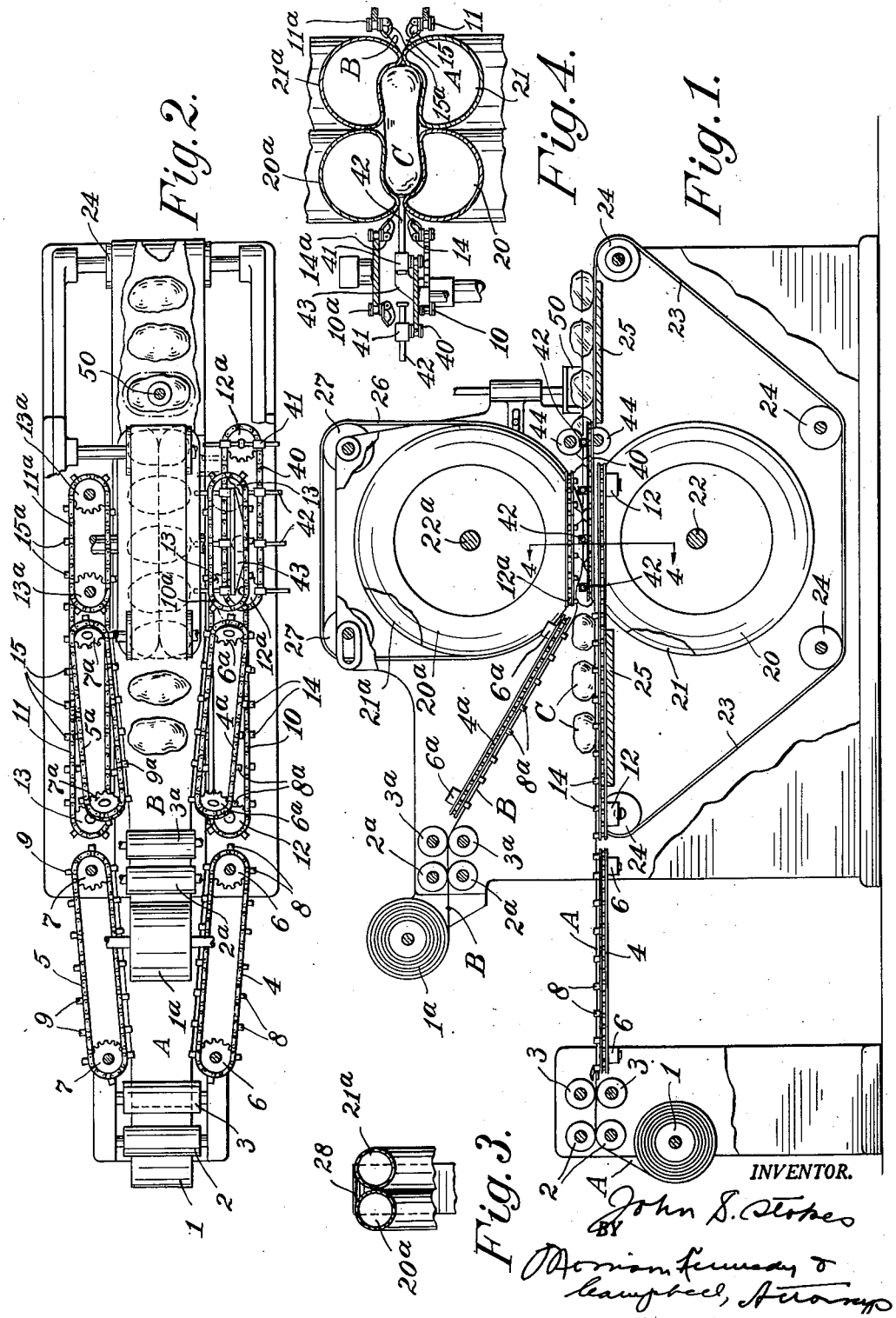

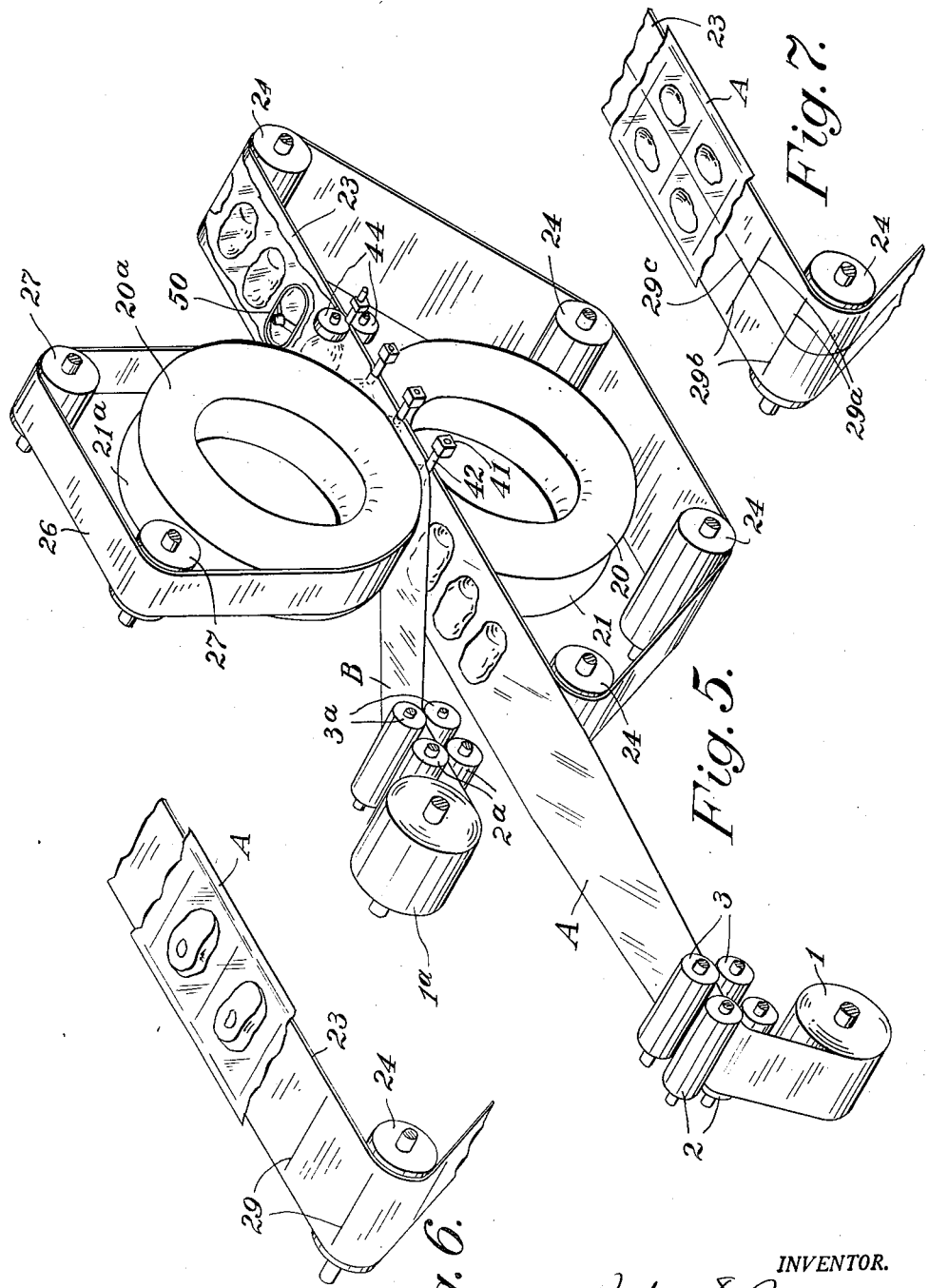

Patented May 20, 1952

2,597,041

UNITED STATES PATENT OFFICE 2,597,041

APPARATUS FOR WRAPPING ARTICLES

John S. Stokes, Huntingdon Valley, Pa.; May Margaret Stokes, John S. Stokes, Jr., D. Robert Yarnall, Philip Price, Percy C. Madeira, Jr., and Provident Trust Company of Philadelphia, executors of said John S. Stokes, deceased, assignors to Stokes & Smith Company, Philadelphia, Pa., a corporation of Pennsylvania Application March 27, 1947, Serial No. 737,589

4 Claims. (Cl. 53—65)

1

This invention is directed to a novel apparatus for wrapping objects of various kinds and of various sizes and shapes. While capable of much wider application, the invention is particularly useful for the wrapping of perishable products, such as meats, vegetables, fruits, etc., contemplating as it does the air-tight packaging of these products.

Generally speaking, the wrapping process in which the apparatus is used consists in feeding two continuous strips of heat-stretchable and heat-sealable sheet material through the machine in opposed spaced relation to each other, heating the strips progressively to impart to them the requisite stretchable and sealable properties, stretching the heated strips progressively both longitudinally and transversely to reduce their gauge and to increase their wrapping area, placing the objects to be wrapped between the strips in longitudinal spaced relation as the strips are fed along and, while maintaining the strips in their stretched condition, pressing them together to seal them around the successive objects to form a series of individual packages. This sealing operation is effected by passing the heated strips, with the objects therebetween, through a pair of cooperating pneumatic members having flexible yielding surfaces which force the strips together into face to face contact except in those areas occupied by the objects and which at the same time allow said objects to stretch such localized areas of the strips still further and conform them thereto. Air is evacuated from the packages as they are successively formed in order to cause the strips to closely embrace the enclosed objects, and the air-evacuating openings of the successive packages are then closed to render the packages air-tight. If desired, the packages may be separated by cutting through the sealed portions of the strips.

While various types of sheet material may be used in the practice of the invention (such as polyvinyl chloride, chlorinated polyvinyl chloride, polyvinyl acetate, etc.), it is proposed to employ, as the most satisfactory wrapping material, a rubber hydrochloride film such as is disclosed in the Calvert Patent No. 1,989,632, and which is known to the trade as Pliofilm. This material is manufactured in sheets of various thicknesses, ranging from .0008" to .003", but even thinner or thicker sheets would be suitable. As is now well known, Pliofilm when heated momentarily (i. e. for a few seconds only) is not only heat-stretchable and heat-sealable but becomes highly elastic, which means that when stretched in heated con-

2 dition the film will return to its original unstretched condition unless it is maintained in its stretched condition until it becomes cool and set in that condition. This elastic property of the film is most useful in the practice of this invention, in that it contributes to the production of smooth tight-fitting wrappings for the objects to be packaged. A convenient heat-stretching and heat-sealing temperature is in the neighborhood of 240° F., and this temperature may be obtained by a few seconds contact with a heated roll maintained at a temperature of say 300° F.

Referring to the drawings:

Fig. 1 is a side elevation, partly in section, of the improved machine;

Fig. 2 is a top plan view thereof;

Fig. 3 is a fragmentary sectional view of a modified form of pneumatic wrapping member, this form comprising a pair of rubber tubes having vulcanized to their outer peripheries a thin rubber sheet which bridges the gap between the tubes;

Fig. 4 is a cross section, slightly enlarged, taken on the line 4—4 of Fig. 2;

Fig. 5 is a perspective view, largely diagrammatic, depicting the wrapping process as a whole;

Fig. 6 is a fragmentary perspective view of the feed belt which carries the objects through the machine and which is provided with markings visible through the transparent strip to define the localized areas to be stretched in the wrapping operation;

Fig. 7 is a view similar to Fig. 6 and showing the feed belt with two series of markings for two lanes of objects;

Figure 8:
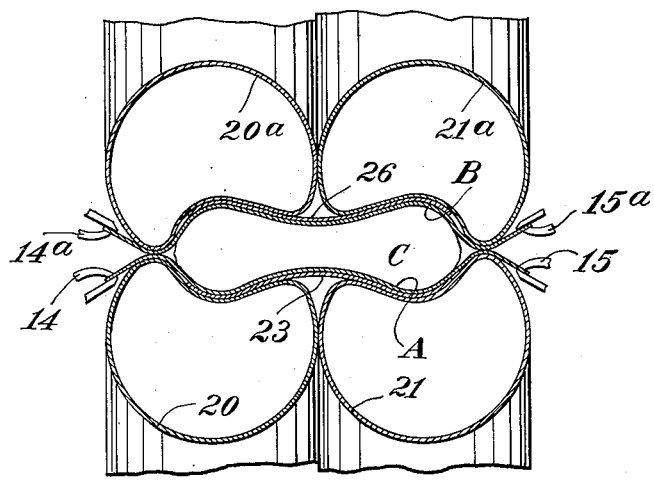
Fig. 8 is a cross section similar to Fig. 2 but on a larger scale to show more clearly the elements involved in performing the wrapping operation.

One strip A of heat-stretchable and heat-sealable material is drawn from a supply roll 1 by a pair of continuously operated feed rolls 2 and led between a pair of continuously operated heated rolls 3 operating at the same rate of speed. The rolls 3 may be heated in any suitable manner, as by steam, hot water or electric heating elements. In passing through the rolls 3, the strip A will be heated progressively to a temperature sufficient to impart to it the requisite heat-stretchable and heat-sealable properties. The temperature will depend, of course, upon the nature and thickness of the material employed, as well as its speed of travel through the machine. In the case of Pliofilm, the preferred material, the temperature will be in the neighborhood of 240° F. as before stated.

As the strip leaves the rolls 3, it is picked up and advanced by a pair of horizontally disposed continuously operated endless gripper chains 4 and 5 arranged at opposite sides of the machine and running over sprocket wheels 6 and 7. The gripper chains are of conventional construction and require no detailed description, their respective gripper elements 8 and 9 being opened and closed automatically and caused successively to grasp the opposite edges of the strip A as it leaves the heated rolls 3. It is here pointed out that the gripper chains 4 and 5 are arranged in diverging relation to each other in the direction of advance of the strip A and are operated at a higher rate of speed than that of the feed rolls 2 and heated rolls 3 (that is to say, the linear speed of travel of the gripper elements 8 and 9 is greater than the peripheral speed of the feed rolls 2 and heated rolls 3), whereby the strip A in its advance is stretched progressively both longitudinally and transversely to increase its wrapping area with a corresponding reduction in gauge. The degree of stretch may be varied as desired, depending only upon the stretch characteristics of the material employed. In the case of Pliofilm, the amount of stretch may be quite extensive without substantially weakening the material notwithstanding the reduction in gauge. As will be understood, the linear speed of travel of the gripper elements 8 and 9 in relation to the peripheral speed of the feed rolls 2 and heated rolls 3 will control the amount of the longitudinal stretch of the strip A, while the angle of divergence of the gripper chains 4 and 5 will control the amount of the transverse stretch of the strip. In this latter connection, it may be noted that the sprocket wheels 6 and 7 farthest removed from the heated rolls 3 are adjustably mounted in the machine so that the angle of divergence of the gripper chains may be varied as desired.

As the strip A in its stretched condition leaves the gripper chains 4 and 5, it is picked up and advanced still further by a second pair of horizontally disposed continuously operated endless gripper chains 10 and 11 arranged at opposite sides of the machine and running over sprocket wheels 12 and 13. This second pair of gripper chains is of the same conventional construction, having gripper elements 14 and 15, respectively, which are opened and closed automatically and which are caused successively to grasp the opposite edges of the advancing strip A. The speed of operation of the gripper chains 10 and 11 is the same as that of the gripper chains 4 and 5, that is to say, the linear speed of travel of the gripper elements 14 and 15 is the same as the linear speed of travel of the gripper elements 8 and 9, but unlike the gripper chains 4 and 5, the gripper chains 10 and 11 are arranged in parallel relation to each other in the direction of advance of the strip A and thus act to maintain the strip in its longitudinally and transversely stretched condition, overcoming any tendency thereof, because of its elasticity, to contract or to return to its original unstretched condition. It may be noted, however, that since the two pairs of gripper chains are operated at the same rate of speed, the gripper elements 14 and 15 of the second pair will not conflict with the gripper elements 8 and 9 of the first pair as they travel around the adjacent sprocket wheels, but will maintain their staggered relation to each other, as best shown in Fig. 2. It may also be noted that, since the gripper chains of the second pair are disposed in parallel relation to each other, whereas the gripper chains of the first pair are disposed in diverging relation to each other, the actual speed of advance of the strip A under the influence of the second pair of gripper chains will be greater than the speed of advance of the strip under the influence of the first pair of gripper chains, with the result that there will be a further progressive longitudinal stretching of the strip (with no further transverse stretching) during the second stage of advance.

As shown most clearly in Fig. 1, the second pair of gripper chains 10 and 11 extend to and beyond the wrapping station, and hence will continue to hold the strip A in its stretched condition and against any contraction either transversely or longitudinally, during the wrapping operation.

A second and companion strip B of heat-stretchable and heat-sealable sheet material is fed to the machine in unison with the strip A under similar conditions and by a similar mechanism. Thus, the strip B is drawn from a supply roll 1ª by a second pair of continuously operated feed rolls 2ª and led between a second pair of continuously operated heated rolls 3ª, it being noted that these elements are mounted at a high enough elevation to provide ample room for the operator to place the objects to be wrapped between the advancing strips before they reach the wrapping station. The strip B is stretched both longitudinally and transversely by a pair of diverging continuously operated endless gripper chains 4ª and 5ª running over sprocket wheels 6ª and 7ª and provided with gripper elements 8ª and 9ª. The gripper chains 4ª and 5ª are thus similar in all respects to the gripper chains 4 and 5 except for being arranged at a downward inclination, as shown, instead of horizontal. The strip B is maintained in its stretched condition by a pair of horizontally disposed continuously operated endless gripper chains 10ª and 11ª running over sprocket wheels 12ª and 13ª and provided with gripper elements 14ª and 15ª, respectively. The gripper chains 10ª and 11ª are thus similar in all respects to the gripper chains 10 and 11 except for being somewhat shorter. The gripper chains 10ª and 11ª also extend to and beyond the wrapping station in order to maintain the strip B in its stretched condition and to hold it against contraction either transversely or longitudinally during the wrapping operation. As best shown in Fig. 1, the gripper chains 10 and 11 are disposed above but in closely spaced relation to the companion gripper chains 10 and 11.

It will now be seen that the two strips A and B are fed through the machine at the same rate of speed, both being stretched to the same extent, first, both longitudinally and transversely in the first zone of advance, and then longitudinally only in the second zone of advance, all to the end of being presented in opposed spaced relation to each other at the wrapping station.

The wrapping operation is performed by means of a pair of cooperating pneumatic members between which the strips A and B are fed, the said members having flexible yielding surfaces which force the strips together in face to face contact except in those areas occupied by the objects C and which at the same time allow said objects to stretch such localized areas of the strips and conform them thereto. These wrapping members may take a variety of forms and still be capable of performing their intended function. In the embodiment shown in Figs. 1, 2, 4, 5 and 8, the pneumatic members are in the form of what might be termed twin tube rolls arranged to rotate with overlapping peripheries to provide the flexible yielding surfaces referred to. Thus the lower roll consists of a pair of thin walled rubber tubes 20 and 21 (similar to the inner tubes of automobile tires) arranged side by side in line contact at their inner faces and mounted to rotate about a common axis 22; and the upper roll consists of a similar pair of thin walled rubber tubes 20ª and 21ª arranged side by side in line contact at their inner faces and mounted to rotate about a common axis 22ª; it being noted that the two axes 22 and 22ª are arranged in vertical alignment. As thus formed the two twin tube rolls, in contacting with each other at the wrapping station, will yield readily to accommodate the successive objects C to be wrapped, providing in effect mold cavities which conform in size and shape to the objects. This action is clearly portrayed in Figs. 4 and 8. As shown in both of these figures, the two strips A and B are firmly held at their opposite edges by the gripper elements 14 and 15 and 14ª and 15ª, respectively, and are thus caused to be stretched by the successive objects to be wrapped, the extent of stretch, of course, depending upon the size of the objects which force the strips out of their own planes and conform them to the surfaces of the objects in those areas which surround or enclose the objects. The twin tube rolls, of course, do not effect this stretching of the strips, although they do aid, by reason of the pressure which they exert upon the objects, to cause the strips to closely embrace the objects and to avoid the formation of folds or wrinkles. The real function of the rolls is to seal the strips together around the successive objects and as close to the objects as their flexible surfaces will permit.

Figure 11:
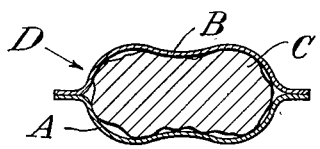
Fig. 11 is a sectional view of a package formed according to the process before air is evacuated therefrom.

Fig. 11 shows a package D such as would be formed by the pneumatic rolls under the conditions stated, it being noted that the two strips A and B are heat-sealed together along a line passing approximately through the center of the object C and stretch-shaped to the object, making a close fitting wrapper of the same contour as the object, regardless of its size or shape. As the wrapped objects pass from between the pneumatic rolls, the gripper elements 14 and 15 and 14ª and 15ª let go of the strips A and B which are then free to contract upon the objects by reason of their elastic property, thus contributing to the close fitting of the wrappers to the objects in the individual packages produced.

It will be understood that the tubes 20, 21 and 20ª, 21ª may be inflated to any desired degree, so long as they are capable of pressing the strips A and B into heat-sealing engagement about the individual objects. With certain objects, the less pressure the better for obvious reasons, but for other objects, such as solid objects, a relatively high pressure would be unobjectionable.

While not entirely necessary, it is proposed to employ a feed belt 23 to carry the objects C to and from the wrapping station. This belt is made of thin flexible elastic material (such as vulcanized rubber) and is operated to travel at the same linear speed as that of the strip A under the influence of the second pair of gripper chains 10 and 11. The belt passes over four pulleys 24, the upper two of which are arranged to give the belt a long upper stretch disposed directly below the advancing strip A and supported at its underside by flat table portions 25 of the framework except, of course, in the region of the wrapping rolls. As shown the belt 23 is not as wide as the strip A but is disposed centrally of the lower twin tube roll 20, 21 so as to bridge the gap between the two tubes. During the wrapping operation, the belt will conform to the shape of the mold cavity produced in the two tubes except for the gap which is left between them (see Fig. 8) and, after the wrapping operation, will resume its original flat condition and act to transport the finished packages (which are cut apart) out of the machine, see Figs. 1 and 2.

A similar belt 26, running over pulleys 27, is associated with the upper twin tube roll 20ª, 21ª, being employed in this instance merely to bridge the gap between the two tubes during the wrapping operation (see Fig. 8).

In lieu of the belt 26, the upper twin tube roll 20ª, 21ª may be provided with a thin flexible elastic rubber band 28, which may be vulcanized to the outer peripheries of the tubes, as shown in Fig. 3. The same is true of the lower twin tube roll 20, 21, in which case the belt 23 could be made to operate beyond the wrapping station only as an out-feed belt for the finished packages.

Preferably, however, it is preferred to utilize the belt 23 both as an in-feed and out-feed belt as shown. When so employed, the belt may be provided with a series of transverse marks or lines 29 (which may be produced thereon in any suitable manner) to guide the operator in positioning the objects C in proper longitudinal spaced relation on the advancing strip A. These marks, which will be visible through the transparent Pliofilm strip, fix the boundary lines for the successive objects and define the localized areas to be stretched by the objects during the wrapping operation. In this way, overlapping of the objects is avoided and ample space allowed between them, after the wrapping operation, to permit the packages to be cut apart through the sealed portions of the strips A and B.

Similar marks or indications, if desired, could be formed directly on the strip A, as for instance by molding, embossing, printing or otherwise. This would be particularly desirable in the case of a non-transparent strip which would render the markings on the belt 23 invisible.

In Fig. 7, the belt 23 is shown as provided with two series of transverse marks or lines 29ª and 29ᵇ with a longitudinal dividing line 29ᶜ to define the wrapping areas for two lanes of smaller objects when fed through the machine.

Figure 9:
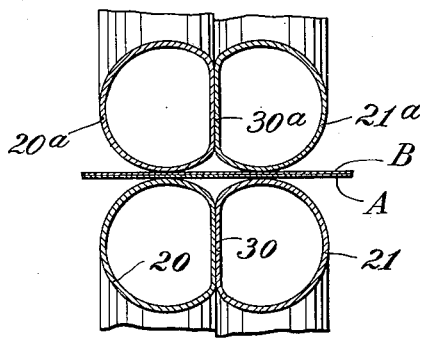
Figs. 9 and 10 are cross sectional views of the two cooperating pneumatic wrapping members in modified form, Fig. 9 illustrating the relation of these members before they make contact, and Fig. 10 illustrating the relation of these members when they are in full contact, as during the wrapping operation.
Figure 10:
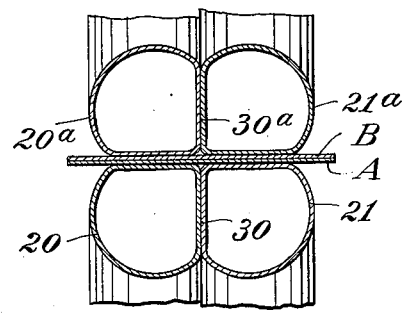

The twin tube rolls 20, 21 and 20ª, 21ª are shown in modified arrangement in Figs. 9 and 10. Here the twin tubes, instead of being arranged in line contact at their inner faces, as in the embodiments already described, are mounted to make an extended surface contact along their inner faces, as at 30, for the lower tubes 20 and 21, and as at 30ª, for the upper tubes 20ª and 21ª. In this way no gaps of any consequence are left between the twin tubes during the wrapping operation. Fig. 9 shows the twin tube rolls just before they contact at their outer peripheries, while Fig. 10 shows them in full surface contact along their outer peripheries, such as would occur if the strips A and B were led through the rolls without an object between the strips. In other words, by this modified arrangement the flexible yielding surfaces provided by the cooperating twin tube rolls are substantially continuous throughout, eliminating the necessity of belts or bands to bridge gaps as in the embodiments above described.

It is not essential that the pneumatic wrapping members be made up of two tubes only; three or more could be employed and arranged in a similar manner. Indeed, each roll could be constituted by a multiplicity of tubes of small cross section to provide the flexible yielding surfaces contemplated. On the other hand, the pneumatic rolls could be made in the form of single tubes with substantially flat surfaces, as for instance in the manner of drums consisting of metal rims with side flanges and rubber dams or bands sealed to the flanges in air-tight fashion.

Figure 12:
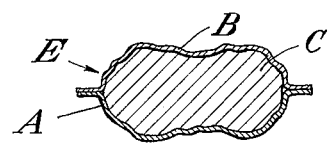
Fig. 12 is a similar view showing the package after the air has been evacuated therefrom.

While the package D shown in Fig. 11 would be entirely satisfactory for many purposes, it is proposed to produce a vacuumized package, such as E shown in Fig. 12, this not only to provide an air-tight cover or wrapper for the object C, but also to remove all air from within the package as a preservative measure. This preservative feature is particularly important in the case of perishable products which deteriorate rapidly in the presence of air.

In carrying out this phase of the process, the machine is equipped with an endless chain 40 carrying a series of suction heads 41 with retractible suction nozzles 42. The chain 40 is arranged between the front lower gripper chain 10 and the front upper gripper chain 10ª, traveling at the same speed as these gripper chains so as to impart to the suction nozzles the same linear speed as that of the gripper elements 14 and 14ª. As will be noted in Fig. 1, the timing of the parts is such that the suction nozzles are caused to enter between the advancing strips A and B before the latter are sealed together by the twin tube wrapping rolls. However, as the nozzles travel along, the strips A and B will be sealed about them as each individual package is formed, thus enabling the nozzles to evacuate all air which would otherwise be trapped in the packages. This evacuation of air is brought about by causing the suction nozzles to pass along a suction chamber 43, connected with a suction pump not shown. After the packages have thus been formed and the air removed, the suction nozzles are withdrawn from the packages and the air-evaculating openings then immediately sealed by a pair of heated rolls 44 which press the strips A and B together in these small localized areas. A cam mechanism (not shown) is employed to effect the withdrawal of the suction nozzles and later to restore them to their original positions for reentry between the strips A and B. If desired, a second chain of suction nozzles could be placed at the opposite side of the machine in order to evacuate the air from both ends of the individual packages.

It is within the purview of the invention to omit the suction chamber 43 and employ the nozzles 42 only as vents through which the air may be evacuated during the wrapping operation. As will be evident, the nature of the wrapping operation is such that most of the air will be forced from the individual packages as the two strips A and B are sealed together around the objects and later allowed to contract, by virtue of their elastic property, into close contact with the objects. In such case, the air-evacuating openings, left by the withdrawal of the suction nozzles, may or may not be sealed, according to the nature of the packages. However, it is preferred to employ the suction chamber 43 in order to produce a fully vacuumized package, for the reasons above stated.

While the packages may be allowed to emerge from the machine as a continuous chain, it is also proposed to cut them apart as they are formed in order to produce a series of separate packages. To this end, the machine is equipped with a reciprocating knife 50 which may be in the form of a hot electrically heated wire to cut through the sealed strips. This knife could be made to cut straight across the strips between the successive packages or, as shown, to cut around the individual packages to remove all surplus material. In the latter instance, of course, the knife will be given a size and shape to conform to the objects to be wrapped, whereas in the former instance the knife will be suitable for objects of all sizes and shapes, having merely to cut the packages apart along transverse lines in the sealed regions between them. As will be understood, the knife should be operated in timed relation to the outfeed of the wrapped objects and a convenient means of accomplishing this result may consist of a trigger to engage the successive packages and to trip the power actuating mechanism which operates the knife.

The entire process is fully depicted in Fig. 5, which shows the strips A and B as they are drawn from their sources of supply and heat-sealed together around the successive objects to be wrapped to form a chain of vacuumized packages which are subsequently cut out of the heat-sealed strips.

Various modifications and alterations will readily suggest themselves to those skilled in the art, and it should, therefore, be understood that the invention is not limited to any specific method or apparatus except insofar as such limitations are expressed in the appended claims.

Having thus described my invention, what I claim is:

1. A machine for wrapping objects comprising, in combination, means for feeding two continuous strips of sheet material in opposed spaced relation to each other, means for simultaneously pressing the strips against and sealing them around successive objects placed therebetween to form a series of individual packages, and suction means for evacuating air from the packages as they are successively formed to cause the strips to closely embrace the enclosed objects, said suction means comprising an endless series of suction elements traveling along in timed relation with the advancing objects and cooperating, one after another, with the successively formed packages.

2. A machine for wrapping objects in heat-sealable sheet material comprising, in combination, means for feeding two continuous strips of said material in opposed spaced relation to each other, means for heating said strips progressively to render them sealable, means for pressing the heated strips together to seal them around successive objects placed therebetween to form a series of individual packages, and means for evacuating air from the packages as they are successively formed to cause the strips to closely embrace the enclosed objects, said air evacuating means comprising an endless series of suction nozzles which are automatically inserted, one after another, in proper position between the heated strips before the latter are sealed around the objects and which are later automatically withdrawn after the air has been evacuated from the packages.

3. A machine according to claim 2, including means for closing the air evacuating openings after the withdrawal of the suction nozzles.

4. A machine for wrapping objects in transparent heat-stretchable material comprising, in combination, means for feeding a strip of said material through the machine, means for heating the strip progressively to render it sufficiently stretchable, means for stretching the heated strip in successive localized areas to conform it to the objects to be wrapped, and a conveyor belt underlying the advancing strip and movable along in unison therewith, said belt having markings thereon visible through the transparent strip and which define the localized areas to be stretched.

JOHN S. STOKES.

REFERENCES CITED

The following references are of record in the file of this patent:

UNITED STATES PATENTS

| Number | Name | Date |
|---|---|---|
| 1,481,866 | Heist | Jan. 29, 1924 |
| 1,970,193 | Riebel, Jr. | Aug. 14, 1934 |
| Re. 20,789 | Bergstein | July 12, 1938 |
| 2,141,318 | Salfisberg | Dec. 27, 1938 |
| 2,145,941 | Maxfield | Feb. 7, 1939 |
| 2,160,367 | Maxfield | May 30, 1939 |
| 2,248,471 | Stroop | July 8, 1941 |
| 2,274,150 | Mack | Feb. 24, 1942 |
| 2,312,049 | Pfeiffer | Feb. 23, 1943 |
| 2,340,260 | Clunan | Jan. 25, 1944 |
| 2,342,977 | Snyder | Feb. 29, 1944 |
| 2,387,812 | Sonneborn et al. | Oct. 30, 1945 |
| 2,412,187 | Wiley et al. | Dec. 3, 1946 |
| 2,432,373 | Bleam et al. | Dec. 9, 1947 |
| 2,438,089 | Carson | Mar. 16, 1948 |
| 2,484,780 | Clunan et al. | Oct. 11, 1949 |
| 2,486,759 | Pfeiffer | Nov. 1, 1949 |
| 2,490,781 | Cloud | Dec. 13, 1949 |

FOREIGN PATENTS

| Number | Country | Date |
|---|---|---|
| 400,597 | Great Britain | Apr. 21, 1933 |